United States Patent
Feldman et al.

(10) Patent No.: US 7,406,264 B2
(45) Date of Patent: Jul. 29, 2008

(54) SYSTEMS, DEVICES, AND METHODS FOR CONTROLLING NON-LINEAR OPTICAL INTERACTIONS

(75) Inventors: Sandra F. Feldman, Owings Mills, MD (US); C. Kent Gardiner, Ellicott City, MD (US)

(73) Assignee: Broadwing Corporation, Austin, TX (US)

( * ) Notice: Subject to any disclaimer, the term of this patent is extended or adjusted under 35 U.S.C. 154(b) by 0 days.

(21) Appl. No.: 11/311,096

(22) Filed: Dec. 19, 2005

(65) Prior Publication Data

US 2006/0126999 A1    Jun. 15, 2006

Related U.S. Application Data

(63) Continuation of application No. PCT/US2004/019551, filed on Jun. 21, 2004.

(60) Provisional application No. 60/480,003, filed on Jun. 20, 2003.

(51) Int. Cl.
  *H04B 10/12* (2006.01)
  *G02B 6/28* (2006.01)
  *G02B 6/00* (2006.01)

(52) U.S. Cl. .................. 398/148; 398/147; 385/15; 385/24

(58) Field of Classification Search ............... 385/24; 398/147, 148, 158, 159
See application file for complete search history.

(56) References Cited

U.S. PATENT DOCUMENTS

| 6,118,566 | A | 9/2000 | Price |
| 6,307,985 | B1 * | 10/2001 | Murakami et al. ............ 385/24 |
| 6,344,922 | B1 | 2/2002 | Grubb et al. |
| 6,449,073 | B1 | 9/2002 | Huber |
| 6,616,636 | B2 | 9/2003 | Lee |
| 6,760,150 | B2 * | 7/2004 | Goto et al. ............ 359/337.12 |
| 6,931,176 | B2 * | 8/2005 | Kelly ........................ 385/24 |
| 7,016,583 | B2 * | 3/2006 | Downie et al. ............. 385/123 |
| 2002/0093711 | A1 | 7/2002 | Simmons et al. |
| 2002/0118936 | A1 | 8/2002 | Tsuritani et al. |
| 2003/0219198 | A1 * | 11/2003 | Zhou ........................ 385/24 |
| 2004/0234272 | A1 * | 11/2004 | Chowdhury et al. ....... 398/147 |

FOREIGN PATENT DOCUMENTS

| WO | WO 01/15368 | 3/2001 |
| WO | WO 01/54425 | 7/2001 |

OTHER PUBLICATIONS

Analysis of Nonlinear Penalties for the T4 Sprint Application, 9 pages.

(Continued)

*Primary Examiner*—M. R. Connelly-Cushwa (57) ABSTRACT

An optical communications system, comprising a first node, first dispersion compensation fiber located in the first node, wherein the first dispersion compensation fiber induces dispersion onto optical signals passing through the first dispersion compensation fiber, a second node, a plurality of spans between the first and second nodes, and second dispersion compensation fiber located in at least one of the spans, wherein the second dispersion compensation fiber induces dispersion onto optical signals passing through the second dispersion compensation fiber, and wherein the dispersion induced by the second dispersion compensation fiber is opposite in sign to that induced by the first dispersion compensation fiber.

18 Claims, 9 Drawing Sheets

OTHER PUBLICATIONS

Bellotti, G., et al, Intensity Distortion Induced by Cross-Phase Modulation and Chromatic Dispersion in Optical-Fiber Transmissions with Dispersion Compensation, IEEE Photonics Technology Letters, vol. 10, No. 12, Dec. 1998, pp. 1745-1747.

Chiang, T.K., at al, Cross-Phase Modulation in Dispersive Fibers: Theoretical and Experimental Investigation of the Impact of Modulation Frequency, IEEE Photonics Technology Letters, vol. 6, No. 6, Jun. 1994, pp. 733-736.

Chiang, T.K., et al, Cross-Phase Modulation in Fiber Links with Multiple Optical Amplifiers and Dispersion Compensators, Journal of Lightwave Technology, vol. 14, No. 3, Mar. 1996, pp. 249-259.

Eiselt, M. et al, Cross-Phase Modulation Distortions in Multi-Span WDM Systems, in Proceedings of the Optical Fiber Communication Conference, San Diego, 1999, pp. 46/ThC5-1-48/ThC5-3.

Eiselt, M., et al, Experimental Comparison of WDM System Capacity in Conventional and Nonzero Dispersion Shifted Fiber, IEEE Photonics Technology Letters, vol. 11, No. 2, Feb. 1999, pp. 281-283.

Fürst, C., et al, Influence of the Dispersion Map on Limitations due to Cross-Phase Modulation in WDM Multispan Transmission Systems, in Proc. Optical Fiber Communication (OFC) Conf., Anaheim, CA, 2001, pp. MF4-1-MF4-3.

Hui, R., et al, Frequency Response of Cross-Phase Modulation in Multispan WDM Optical Fiber Systems, IEEE Photonics Technology Letters, vol. 10, No. 9, Sep. 1998, pp. 1271-1273.

Kikuchi, N., et al, 10 Gbit/s Dispersion-Compensated Transmission Over 2245-km Conventional (Non-Dispersion-Shifted) Fibers in a Recirculating Loop, OFC Technical Digest, pp. 306-307.

Kikuchi, N., et al, Analysis of Cross-Phase Modulation (XPM) Effect on WDM Transmission Performance, Electronics Letters, vol. 33, No. 8, Apr. 10, 1997, pp. 653-654.

Kikuchi, N. and Sasaki, S., Fibre Nonlinearity in Dispersion-Compensated Conventional Fibre Transmission, Electronics Letters, vol. 32, No. 6, Mar. 14, 1996, pp. 570-572.

Lucero, A.J., et al, Impact of Bit Pattern and Dispersion Variation on Cross-Phase Modulation Penalty, Optical Fiber Communication (OFC) Conf., San Diego, CA, 1999, pp. ThC2-1/37-ThC2-3/39.

Marhic, M.E., et al, Cancellation of Third-Order Nonlinear Effects in Amplified Fiber Links by Dispersion Compensation, Phase Conjugation, and Alternating Dispersion, Optics Letters, vol. 20, No. 8, Apr. 15, 1995, pp. 863-865.

Marhic, M.E., et al, Optimizing the Location of Dispersion Compensators in Periodically Amplified Fiber Links in the Prescence of Thrid-Order Nonlinear Effects, IEEE Photonics Technology Letters, vol. 8, No. 1, Jan. 1996, pp. 145-147.

Mikhailov, V., et al, Limitation to WDM Transmission Distance due to Cross-Phase Modulation Induced Spectral Broadening in Dispersion Compensated Standard Fiber Systems, IEEE Photonics Technology Letters, vol. 11, No. 8, Aug. 1999, pp. 994-996.

Sekine, K., et al, Dispersion Compensated 80 Gbit/s WDM Transmission Over 1171 km Standard Singlemode Fibre, Electronics Letters, vol. 31, No. 13, Jun. 22, 1995, pp. 1080-1082.

Shtaif, M. and Eiselt, M., Analysis of Intensity Interference Caused by Cross-Phase Modulation in Dispersive Optical Fibers, IEEE Photonics Technology Letters, vol. 10, No. 7, Jul. 1998, pp. 979-981.

Shtaif, M. and Eiselt, M., Impact of Cross Phase Modulation in WDM Systems, in Proceedings of the Optical Fiber Communication Conference, Baltimore, 2000, (invited), Paper ThM1.

Smith, N.J, and Doran, N.J., Modulational Instabilities in Fibers with Periodic Dispersion Management, Optics Letters, vol. 21, No. 8, Apr. 15, 1996, pp. 570-572.

Tanaka, T., et al, 2.1-Tbit/s WDM Transmission Over 7,221 km with 80-km Repeater Spacing, Eur. Conf. Optical Communication (ECOC), Munich, Germany, PD1.8.

Ten, S., et al, Comparison of Four-Wave Mixing and Cross Phase Modulation Penalties in Dense WDM Systems, in Proc. Optical Fiber Communication Conf. and Int. Conf. Integrated Optics and Optical Fiber Communication (OFC/IOOC), vol. 3, San Diego, CA, Feb. 21-26, 1999, pp. ThC4-1/43-ThC4-3/45.

Thiele, H.J., et al, Influence of Fibre Dispersion and Bit Rate on Cross-Phase-Modulation-Induced Distortion in Amplified Optical Fibre Links, Electronics Letters, vol. 34, No. 21, Oct. 15, 1998, pp. 2050-2051.

Thiele, H.J., et al, Influence of Transmission Distance on XPM-Induced Intensity Distortion in Dispersion-Managed, Amplified Fibre Links, Electronics Letters, vol. 35, No. 5, Mar. 4, 1999, pp. 408-409.

Thiele, H.J., et al, Simple Technique to Determine Cross-Phase Modulation Induced Penalties in WDM Transmission, 25th Optical Fiber Communication Conference (OFC 2000), Paper, Baltimore, MD, Mar. 7-10, 2000, pp. ThM2-1-ThM2-4.

Yoshida, E., et al, 20 GHz, 1.8 ps Pulse Generation from a Regeneratively Modelocked Erbium-doped Fibre Laser and its Femtosecond Pulse Compression, Electronics Letters, Mar. 2, 1995, vol. 31, No. 5, pp. 377-378.

Hecht, Jeff, Understanding Fiber Optics, 4th ed., 2001, Prentice-Hall, p. 88.

International Search Report for PCT/US04/19951.

Written Opinion for PCT/US04/19951.

* cited by examiner

SYSTEMS, DEVICES, AND METHODS FOR CONTROLLING NON-LINEAR OPTICAL INTERACTIONS

CROSS-REFERENCE TO RELATED APPLICATIONS

This application is a continuation of PCT Patent Application Number PCT/US04/019551, filed Jun. 21, 2004, which claims priority from U.S. Patent Application Ser. No. 60/480,003, filed Jun. 20, 2003, all of which are incorporated herein by reference.

STATEMENT REGARDING FEDERALLY SPONSORED RESEARCH OR DEVELOPMENT

Not Applicable.

FIELD OF THE INVENTION

The present invention is directed generally to optical communications systems and methods and, more particularly, to systems and methods which reduce or control penalties caused by non-linear interactions.

BACKGROUND OF THE INVENTION

Optical communications systems can suffer from many problems and phenomenon, particularly systems which carry a large number of high capacity channels. One particular problem is non-linear optical interactions between signals. This problem is more severe in systems using low dispersion fibers, such as True Wave Classic, True Wave RS, and LEAF, but non-linear interactions can also be problematic in systems which do not use low dispersion fibers. Non-linear effects can include cross-phase modulation, self-phase modulation, and four wave mixing. The penalties associated with non-linear interactions can adversely affect the performance of a system, such as by reducing the signal population which can propagate the desired distance on a given fiber type, and by reducing the reach of the system.

Several prior art solutions have been proposed to address the problems of non-linear interactions. Unfortunately, all of the prior art solutions have significant disadvantages. One prior art solution is to operate in the "L-band" rather than the "C-band". Although that solution would solve some of the problems caused by non-linear interactions, it has several serious drawbacks. For example, L-band components are not as readily available as C-band components, resulting in substantially increased costs. Furthermore, a substantial engineering investment will be required to produce an L-band product suite. As a result, this solution will be very expensive to implement, both in monetary cost and development time.

Another prior art solution is to reduce the number of channels in the C-band, and/or to reduce the launch power and reach of the system. While these solutions can reduce the effects of non-linear interactions by spacing signal channels farther apart and by eliminating poorly performing channels, it demands that the system performance (e.g., reach and/or capacity) be reduced. Although the system performance can be increased through the use of additional regenerators, regenerators are expensive and add to the cost of the system.

Figure 1:
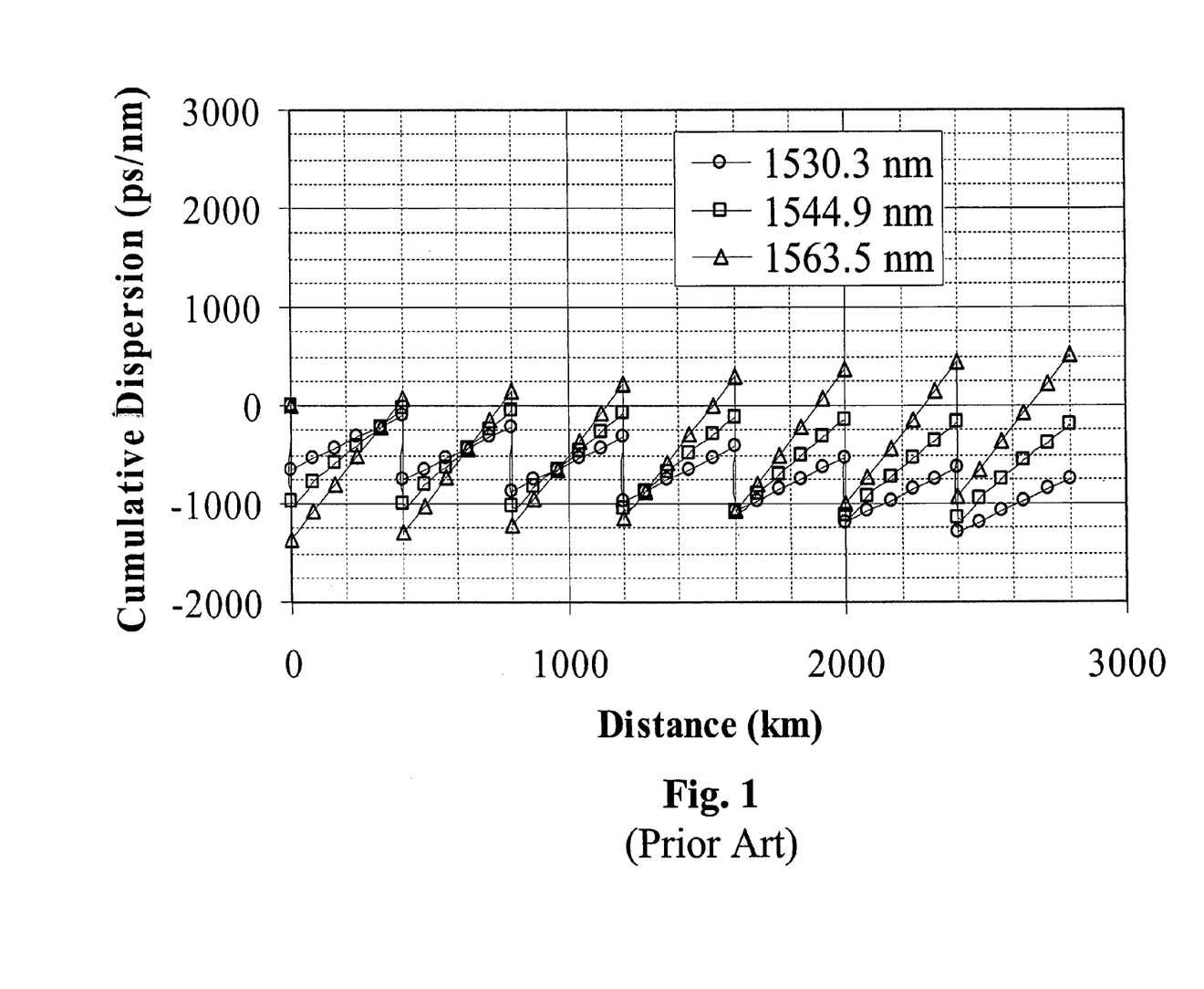
FIG. 1 is a dispersion map according to one embodiment of the prior art.

FIG. 1 illustrates an exemplary prior art dispersion map using True Wave Classic fiber. In that example, there are seven links, each link with five spans, and each span being eighty kilometers long. In that example, negative dispersion compensation is provided in each transmit node using a commercially available dispersion compensation module. The negative dispersion compensation is used to offset the positive dispersion introduced by the fibers over which the signals travel. The dispersion compensation can be chosen so that the center band (1544.9 nm), or another portion of the band, is well compensated. However, other portions of the band, such as the signals at edges (e.g., 1530.3 nm and 1563.5 nm), experience significant residual dispersion (e.g., about −750 ps/nm and +500 ps/nm, respectively, after propagating 2800 km). Further, the low wavelength portion of the C-band also experiences high non-linear penalties on this dispersion map. As a result, this prior art technique provides, at best, a partial solution to the problem, and introduces significant other problems in the form of the high dispersion variations at the edge of the band. Note that other prior art dispersion maps, which distribute the total dispersion compensating fiber required into smaller units in both the nodes and the spans, have even greater nonlinear penalties.

Another prior art solution is to individually dispersion compensate optical signal channels. While that solution may succeed in overcoming problems of high dispersion variation described above, it requires significant equipment and a significant increase in cost. In many systems, where the number of channels is very high, this solution cannot be used.

Another problem with the prior art is that standard dispersion compensating fiber is poorly slope-matched to some types of fiber, such as True Wave Classic. As a result, even for perfectly compensated links, signals at the edges of the C-band will encounter substantial residual dispersion at the end of long links. Although the length of the link will vary depending on many factors in the link, a typical link of 1,000 km will likely experience substantial residual dispersion. The penalty can be so high that some systems will not achieve acceptable bit-error-rate performance. The problem is further exacerbated by the fact that it is not feasible to perfectly compensate installed links, given the variation in the dispersion compensation fiber (DCF) coils and variation in length and dispersion of spans.

Figure 2:
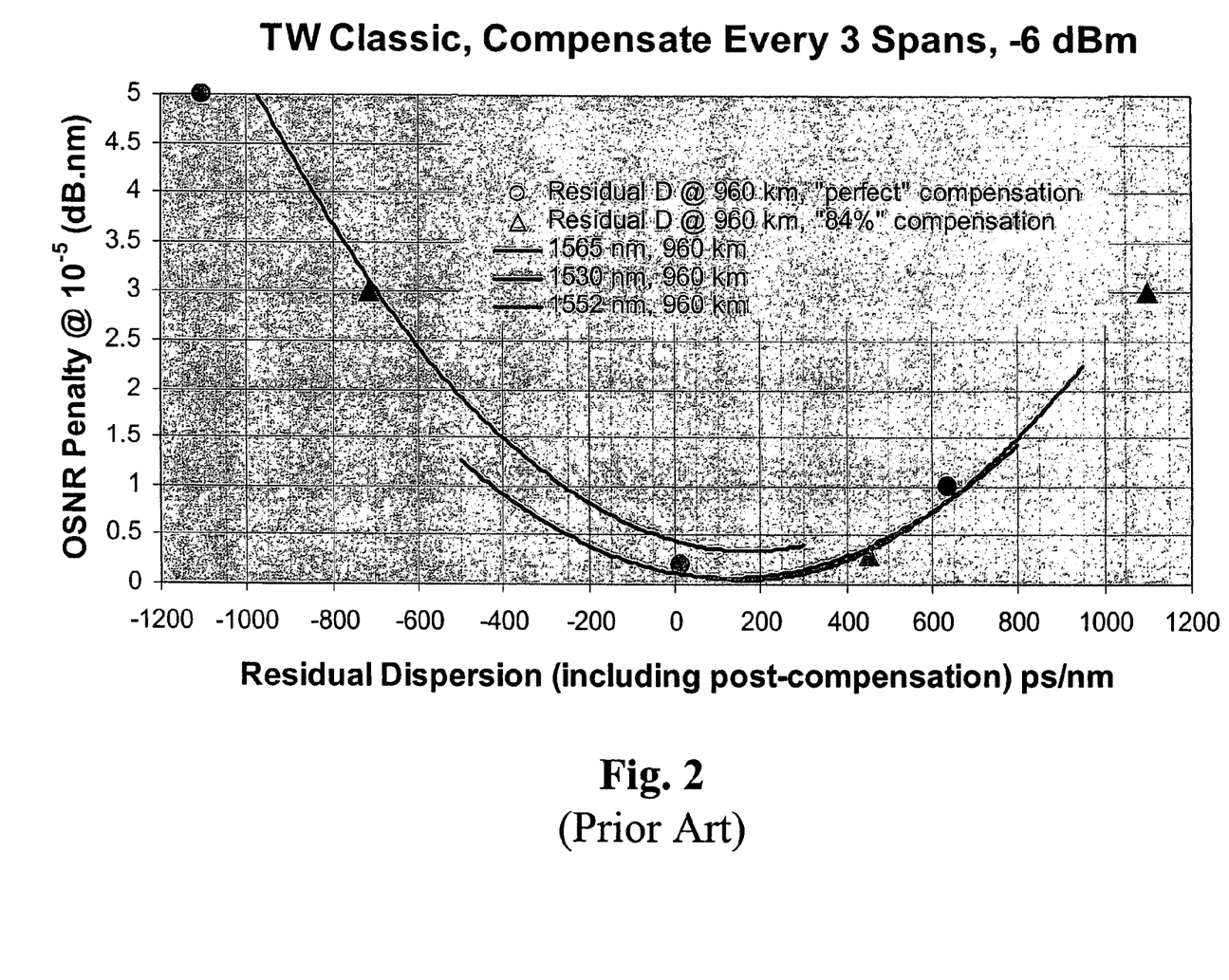
FIG. 2 is a diagram of OSNR Penalty verses residual dispersion illustrating the impact of poor slope compensation as may be seen in the prior art.

FIG. 2 is a diagram of OSNR Penalty verses residual dispersion illustrating the impact of poor slope compensation as may be seen in the prior art. Residual dispersion at high and low ends of the C-band is so high (or low) that significant OSNR penalties are incurred. This figure illustrates an example using True Wave Classic, compensated every three spans at −6 dBm.

One prior art solution is to use dispersion tolerant modulation modalities. This limits the user to relatively low bit rates or complex modalities. A second solution is to install dispersion compensation for blocks of wavelengths. Whether multiple dispersion compensation paths are installed along the length of the link or whether blocks of wavelengths are specially compensated at the end of the link, this adds cost to the network.

Accordingly, there is a need for systems, devices, and methods to control or compensate for non-linear interactions and which also provides for good system performance. Those and other advantages of the present invention will be described in more detail hereinbelow.

BRIEF SUMMARY OF THE INVENTION

It has been found that the introduction of additional dispersion according to the present invention results in a reduction in non-linear interaction penalties. For example, some advantages are realized with the introduction of dispersion which must be compensated for at another location in the system. In the case of the embodiment illustrated in FIG. 5, the optical signals generally acquire positive dispersion as they move through that system. Nonetheless, additional positive dispersion is introduced, such as in line amplifiers between the spans, and that additional dispersion must be compensated with negative dispersion which is added at the nodes. Nonetheless, that additional positive dispersion, when utilized as described herein, provides improved performance. The optimal amount of dispersion, both positive and negative, depends on several factors, such as "residual dispersion" and "bit walkoff".

One embodiment of the present invention is an optical communications system, comprising a first node, first dispersion compensation fiber located in the first node, wherein the first dispersion compensation fiber induces dispersion onto optical signals passing through the first dispersion compensation fiber, a second node, a plurality of spans between the first and second nodes, and second dispersion compensation fiber located in at least one of the spans, wherein the second dispersion compensation fiber induces dispersion onto optical signals passing through the second dispersion compensation fiber, and wherein the dispersion induced by the second dispersion compensation fiber is opposite in sign to that induced by the first dispersion compensation fiber.

Another embodiment of the present invention is an optical communication system comprising a plurality of nodes, a plurality of links, each link connecting a plurality of nodes, a plurality of spans forming each link, dispersion compensation fiber located in at least some of the nodes, and dispersion compensation fiber located in at least some of the links, wherein the dispersion compensation fiber in the links is opposite in sign to the dispersion compensation fiber in the nodes.

Another embodiment of the present invention is a method of propagating an optical signal comprising dispersion compensating the optical signal in a first node, directing the optical signal into a link, dispersion compensating the optical signal a plurality of times in the link, such that dispersion compensation in the link is opposite the dispersion compensation in the first node, and directing the optical signal into a second node.

Another aspect of the invention provided herein is to allow all C-band wavelengths to travel on the same dispersion map. It is expected to be less expensive than the prior art alternatives and to allow the network designer greater flexibility. Although the invention will be described in terms of the C-band, it may also be applied to other transmission bands, or portions or combinations thereof.

Many variations are possible with the present invention. For example, dispersion compensation does not necessarily need to be introduced in every node and link. For example, dispersion compensation may be introduced in only one of a pair of nodes corresponding to a link, and dispersion compensation may be introduced consistently or inconsistently, depending on the particular application. Similarly, the type of dispersion, positive and negative, may be varied and changed according to the teachings of the present invention. These and other teachings, variations, and advantages of the present invention will become apparent from the following detailed description of the invention.

BRIEF DESCRIPTION OF THE SEVERAL VIEWS OF THE DRAWING

Embodiments of the present invention will now be described, by way of example only, with reference to the accompanying drawings for the purpose of illustrating the embodiments, and not for purposes of limiting the invention, wherein.

DETAILED DESCRIPTION OF THE INVENTION

Figure 3:
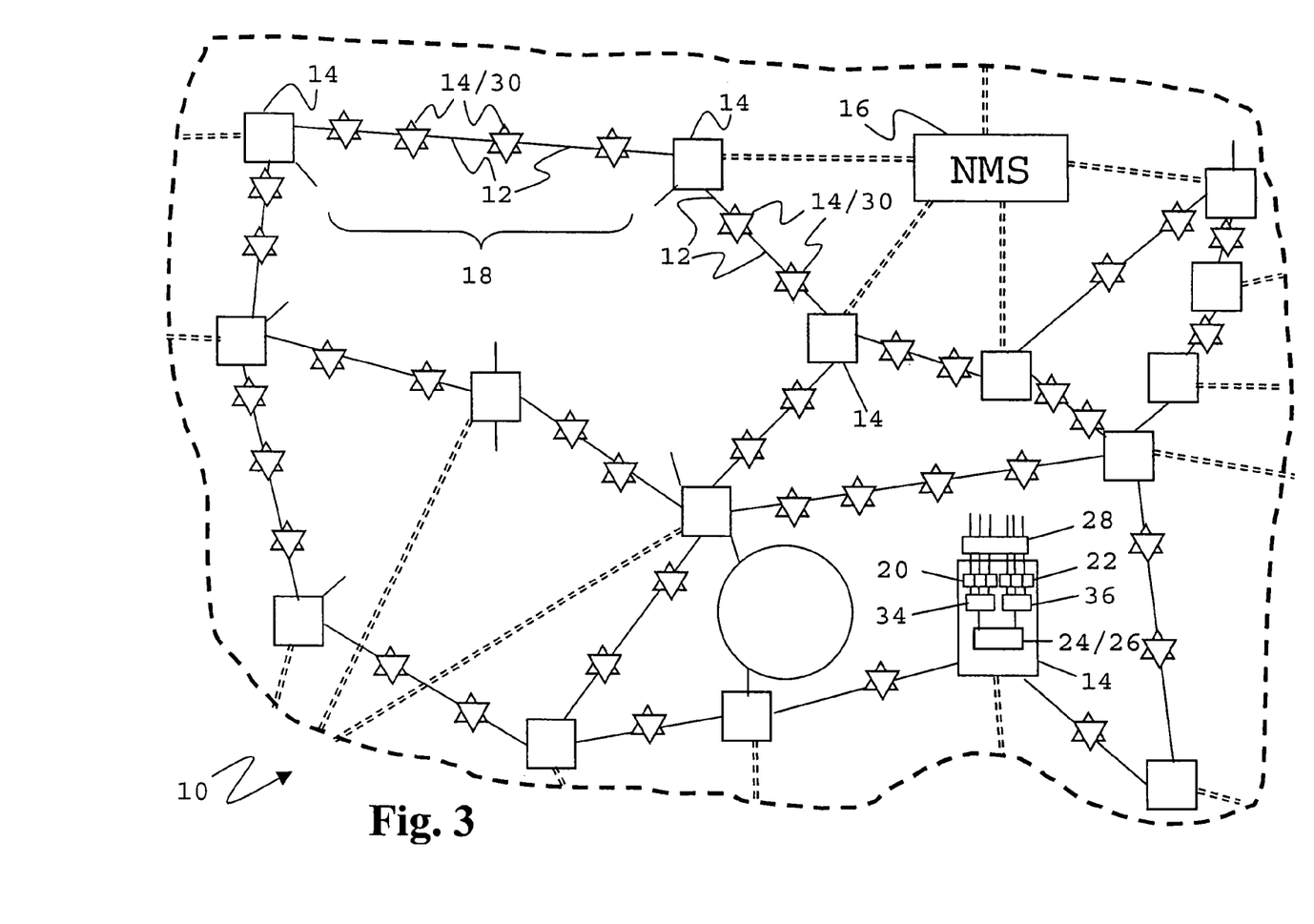
FIGS. 3 and 4 illustrate examples optical communications systems.

FIG. 3 illustrates an optical communications system 10 which includes optical paths 12 connecting nodes and network elements 14. Advantages of the present invention can be realized with many system 10 configurations and architectures, such as an all optical network, one or more point to point links, one or more rings, a mesh, other architectures, or combinations of architectures. The system 1O illustrated in FIG. 3 is a multi-dimensional network, which can be implemented, for example, as an all optical mesh network, as a collection of point to point links, or as a combination of architectures. The system 10 can employ various signal formats, and can also convert between formats. The system 10 can also include more or less features than those illustrated herein, such as by including or deleting a network management system ("NMS") 16 and changing the number, location, content, configuration, and connection of nodes 14.

The optical paths 12 can include guided and unguided transmission media, such as one or more optical fibers, ribbon fibers, planar devices, and free space devices, and can interconnect the nodes 14 providing optical communication paths through the system 10. Various types of transmission media can be used, such as dispersion shifted ("DSF"), non-dispersion shifted ("NDSF"), non-zero dispersion shifted ("NZDSF"), dispersion compensating ("DCF"), polarization maintaining ("PMF"), single mode ("SMF"), multimode ("MMF"), other types of transmission media, and combinations of transmission media. Furthermore, the transmission media can be doped, such as with erbium, germanium, neodymium, praseodymium, ytterbium, other rare earth elements, other dopants, and mixtures thereof. The paths 12 can carry one or more uni- or bi-directionally propagating optical signal channels or wavelengths. The optical signal channels can be treated individually or as a single group, or they can be organized into two or more wavebands or spectral groups, each containing one or more optical signal channel. The optical signal channels within a spectral group are all treated the same. For example, all optical signal channels in a spectral group are switched in the same manner, and all are dropped at the same locations, even if every optical signal channel in the spectral group is not utilized at every location at which it is dropped. The use of spectral groups to treat groups of channels in the same manner is one way to efficiently manage large numbers of optical signal channels. One or more paths 12 can be provided between nodes 14 and can be connected to protection switching devices and/or other redundancy systems. The optical path 12 between adjacent nodes 14 is typically referred to as a link 18, and the optical path 12 between adjacent components along a link 18 is typically referred to as a span.

The nodes and network elements 14 can include one or more signal processing devices including one or more of various optical and/or electrical components. The nodes 14 can perform network functions or processes, such as switching, routing, amplifying, multiplexing, combining, demultiplexing, distributing, or otherwise processing optical signals. For example, nodes 14 can include one or more transmitters 20, receivers 22, switches 24, add/drop multiplexers 26, amplifiers 30, interfacial devices 28, multiplexers/combiners 34, and demultiplexers/distributors 36, as well as filters, dispersion compensating and shifting devices, monitors, couplers, splitters, and other devices. One embodiment of one node 14 is illustrated in FIG. 3, although the nodes 14 can have many other variations and embodiments. Additional examples of nodes 14 are described in U.S. patent application Ser. No. 09/817,478, filed Mar. 26, 2001, and U.S. Pat. No. 6,344,922, issued Feb. 5, 2002, both of which are incorporated herein by reference.

The NMS 16 can manage, configure, and control nodes 14 and can include multiple management layers that can be directly and indirectly connected to the nodes 14. The NMS 16 can be directly connected to some nodes 14 via a data communication network (shown in broken lines) and indirectly connected to other nodes 14 via a combination of a directly connected node and communications paths in the optical system 10. The data communication network can, for example, be a dedicated network, a shared network, or a combination thereof. A data communications network utilizing a shared network can include, for example, dial-up connections to the nodes 14 through a public telephone system. The NMS 16 can reside at one or more centralized locations and/or can be distributed among components in the system 10. Mixed data or supervisory channels can be used to provide connections between the network elements of the NMS 16, which can be located in nodes 14 or remote from nodes 14. The supervisory channels can be transmitted within and/or outside the signal wavelength band and on the same medium or a different medium than the wavelength band. Examples of an NMS 16 are described in U.S. Patent Application Ser. No. 60/177,625, filed Jan. 24, 2000, and PCT Patent Application PCT/US01/02320, filed Jan. 24, 2001 (published as WO 01/54425), both of which are incorporated herein by reference.

The transmitters 20 and receivers 22 are configured respectively to transmit and receive optical signals including one or more information carrying optical signal wavelengths, or channels, via the optical paths 12. The transmitters 20 and receivers 22 can be used in multiple and single channel systems, and can provide varying reach (e.g., short, intermediate, and long reach). The transmitters 20 and receivers 22 can also be part of a device that includes standardized interface transmitters and receivers, such as to support interoperability with other devices and systems, which is particularly useful in WDM applications.

The transmitters 20 include an optical source that provides an optical carrier and can utilize, for example, coherent or incoherent sources, and narrow band or broad band sources, such as distributed feedback ("DFB") sources, distributed Bragg reflection ("DBR") sources, sliced spectrum sources, fiber lasers, semiconductor lasers, light emitting diodes, and other optical sources. The transmitters 20 often include a narrow bandwidth laser as the optical source. The transmitter 20 can impart information onto the optical carrier or onto one or more subcarriers or sidebands. Typically, information is imparted by directly modulating the optical source, by externally modulating the optical carrier, or by modulating the information onto one or more subcarriers or sidebands of the optical carrier, with the later sometimes called sub-carrier modulation ("SCM"). The transmitter 20 may utilize one or more types of modulators, such as electro-optic (e.g., lithium niobate), electro-absorptive, etc.

The receiver 22 can include various detection techniques, such as coherent detection, optical filtering and direct detection, as well as other techniques and combinations thereof. The receiver 22 can include filters, such as fiber Bragg grating filters, bulk grating filters, or other types of filters, or filtering can be performed outside of the receiver 22.

The transmitters 20 and receivers 22 can utilize one or more formats to transmit and receive optical signals. For example, modulation formats such as amplitude modulation, frequency modulation, phase modulation, polarization modulation, power modulation, other modulation formats and combinations of formats, such as quadrature amplitude modulation, can be used. Also, return to zero ("RZ") or non-return to zero ("NRZ") formats can be used with various modulation techniques. Different encoding formats can also be used, such as differential encoding, duobinary encoding, other encoding formats, and combinations thereof. One or more multiplexing formats can be employed, such as space, time, code, frequency, phase, polarization, wavelength, other types, and combinations thereof. The format can also include one or more protocols, such as SONET/SDH, IP, ATM, Digital Wrapper, GMPLS, Fiber Channel, Ethernet, etc. Other signal formats, such as soliton, pulse, chirp, etc, can also be used. Transmitters 20 and receivers 22 can utilize the same format for all channels throughout the system 10, or different formats can be used for different channels and/or in different parts of the system 10, with appropriate format conversion being performed by the transmitters 20 and receivers 22 or by other devices. Examples of optical transmitters 20 are described in U.S. Pat. No. 6,118,566, issued Sep. 12, 2000, which is incorporated herein by reference.

Tunable transmitters 20 and receivers 22 can be used, such as to provide flexibility in the selection of wavelengths used in the system 10. The transmitters 20 and receivers 22 can also include or be associated with other components to perform other signal processing, such as reshaping, retiming, error correction, protocol processing, pre-emphasis, and optical and/or electrical pre- and post-dispersion and distortion compensation. For example, receivers 22 can be connected to the transmitters 20 in back to back configuration as a transponder or regenerator. The regenerator can be deployed as a 1R, 2R, or 3R regenerator, depending upon whether it serves as a repeater (R1: repeat), a remodulator (R2: reshape & repeat), or a full regenerator (R3: reshape, retime, repeat), respectively. The transmitters 20 and receivers 22 in a WDM system can be operated in a uniform manner or the transmission and reception characteristics of the signal channels can be tailored individually and/or in groups.

The switches 24 can take many forms and can have different levels of "granularity". "Granularity" refers to the resolution or precision with which the switching is performed. For example, VWDM switches 24 can switch individual wavelengths (also called "channels"), groups of wavelengths, or portions of wavelengths. Before being switched, the signals can be demultiplexed into the appropriate level of granularity, and after being switched the signals can be multiplexed into the desired format, using the same or different modulation formats, wavelengths, or other characteristics.

Switches 24 can have electrical, optical, or electrical/optical switch "fabrics". The switch "fabric" refers to the technology used to perform the switching. Switches 24 having an electrical fabric convert incoming optical signals into electrical signals, the electrical signals are switched with electronic equipment, and the switched electrical signals are converted back into optical signals. Such switching is often referred to as "O-E-O" ("optical-electrical-optical") switching. In contrast, switches 24 having an optical switch fabric perform the switching with the signals in the optical domain. However, switches 24 having an optical switch fabric can still perform O-E-O conversions, such as when demultiplexing or multiplexing optical signals, or in other related interface devices or operations.

There are many optical switch fabrics, some of which use micro-electromechanical systems ("MEMS"), such as small, electrically-controlled mirrors, to selectively reflect an incoming optical signal to a desired output. Other optical switch fabrics use a variable index of refraction device to controllably change the index of refraction of an optical signal path, such as by forming a gas pocket in an optically transparent liquid medium, in order to change the direction of the optical signal. Yet another example of an optical switch fabric is the use of an optical path in which the optical gain and/or loss can be controlled so that an optical signal can be either passed or blocked. Some examples of switches 24 having an optical fabric are described in U.S. patent application Ser. Nos. 09/119,562, filed Jul. 21, 1998, and 60/150,218, filed Aug. 23, 1999, and PCT Patent Application PCT/US00/23051, filed Aug. 23, 2000 (published as WO 01/15368), all of which are incorporated herein by reference.

Switches 24 can be grouped into two categories: integrated switches and interfacial switches. Integrated switches allow for optical continuity of signals, while interfacial switches introduce an optical discontinuity which interrupts optical signals with one or more O-E-O conversion, either in the switch itself or in a related component such as a multiplexer 34, demultiplexer 36, or other interface device. In contrast, integrated switches are optically integrated into the system 10 and allow optical signals to continue through the system 10, via the integrated switch 24, without an O-E-O conversion or optical discontinuity. Integrated switches 24 are sometimes called "all-optical switches", "O-O" switches, or "O-O-O" switches. Interfacial switches 24 are a type of interfacial device 28, which is discussed in more detail hereinbelow. Interfacial switches are located within or at the periphery of networks 10 and point to point links 18, such as between two or more point to point links 18, between two or more networks 10, or between a network 10 and a point to point link 18. A switch 24 can have both an integrated switch 24 portion and a interfacial switch 24 portion, such that some signals are switched without an O-E-O conversion, while other signals are subjected to an O-E-O conversion.

Switches 24 can have many forms and variations. For example, in addition to being integrated or dedicated, and having an optical and/or electrical switch fabric, a switch 24 can be polarization-sensitive or polarization-insensitive. As discussed hereinbelow in more detail, the present invention can produce a pair of optical signals which have orthogonal polarization and which occupy the same optical frequency range. A switch 24 which is polarization sensitive can switch those signals separately, possible sending them to different destinations. A polarization-insensitive switch 24 can also be used with such signals, but the pair of signals will be switched together such that both are switched to the same destination. For example, an integrated, polarization-insensitive switch 24 might filter the optical frequency range containing the orthogonally polarized pair of signals, and switch that filtered signal using an optical switch fabric, without regard to whether it contains a single signal or a pair of orthogonally polarized signals.

Add/drop multiplexers 26 and other devices can function in a manner analogous to integrated switches 24 so that, in general, only optical signals which are being "dropped" from the network 10 are converted into electronic form. The remaining signals, which are continuing through the network 10, remain in the optical domain. As a result, optical signals in an all-optical system 10 (e.g., systems 10 having integrated switches 24 and integrated add/drop multiplexers 26) are not converted into electrical form until they reach their destination, or until the signals degrade to the point they need to be regenerated before further transmission. Of course, add/drop multiplexers 26 can also be interfacial devices 28.

Interfacial devices 28 generally act as interfaces to and between optical networks 10 and/or point to point links 18. Interfacial devices 28 typically perform at least one optical-to-electrical ("O-E") or electrical-to-optical ("E-O") conversion. In the case of an interfacial switch 24, for example, signals are subjected to an O-E-O conversion before proceeding to the next link 18 or network 10. Interfacial devices 28 can, for example, act as an interface between electrical and optical systems or devices, between different formats, or at other interfaces. Interfacial device 28 can be located within or at the periphery of networks 10, such as between two or more networks 10, between two or more point to point links 18, and between networks 10 and point to point links 18. Interfacial devices 28 can include, for example, cross-connect switches, IP routers, ATM switches, etc., and can have electrical, optical, or a combination of switch fabrics. Interfacial devices 28 can provide interface flexibility and can be configured to receive, convert, and provide information in one or more various formats, protocols, encoding schemes, and bit rates to the transmitters 20, receivers 22, and other devices. The interfacial devices 28 also can be used to provide other functions, such as protection switching.

The optical amplifiers 30 can be used to provide signal gain, such as to overcome attenuation, and can be deployed proximate to other optical components, such as in nodes 14, as well as along the optical communications paths 12. The optical amplifiers 30 can include concentrated/lumped amplification and/or distributed amplification, and can include one or more stages. The optical amplifier can include, for example, doped (e.g. erbium, neodymium, praseodymium, ytterbium, other rare earth elements, other dopants, and mixtures thereof) and/or non-linear interaction amplifiers (e.g., Raman amplifiers, Brillouin amplifiers, etc.), and can be locally and/or remotely pumped with optical energy. The optical amplifiers 30 can also include other types of amplifiers 30, such as semiconductor amplifiers. Two or more amplifiers 30 may be co-located and concatenated to provide additional flexibility.

Optical combiners 34 can be used to combine the multiple signal channels into WDM optical signals for the transmitters 20. Likewise, optical distributors 36 can be provided to distribute the optical signal to the receivers 22. The optical combiners 34 and distributors 36 can include various multi-port devices, such as wavelength selective and non-selective ("passive") devices, fiber and free space devices, and polarization sensitive devices. Other examples of multi-port devices include circulators, passive, WDM, and polarization couplers/splitters, dichroic devices, prisms, diffraction gratings, arrayed waveguides, etc. The multi-port devices can be used alone or in various combinations with various tunable or fixed wavelength transmissive or reflective, narrow or broad band filters, such as Bragg gratings, Fabry-Perot and dichroic filters, etc. in the optical combiners 34 and distributors 36. Furthermore, the combiners 34 and distributors 36 can include one or more serial or parallel stages incorporating various multi-port device and filter combinations to multiplex, demultiplex, and/or broadcast signal wavelengths $\lambda_i$ in the optical systems 10.

Figure 4:
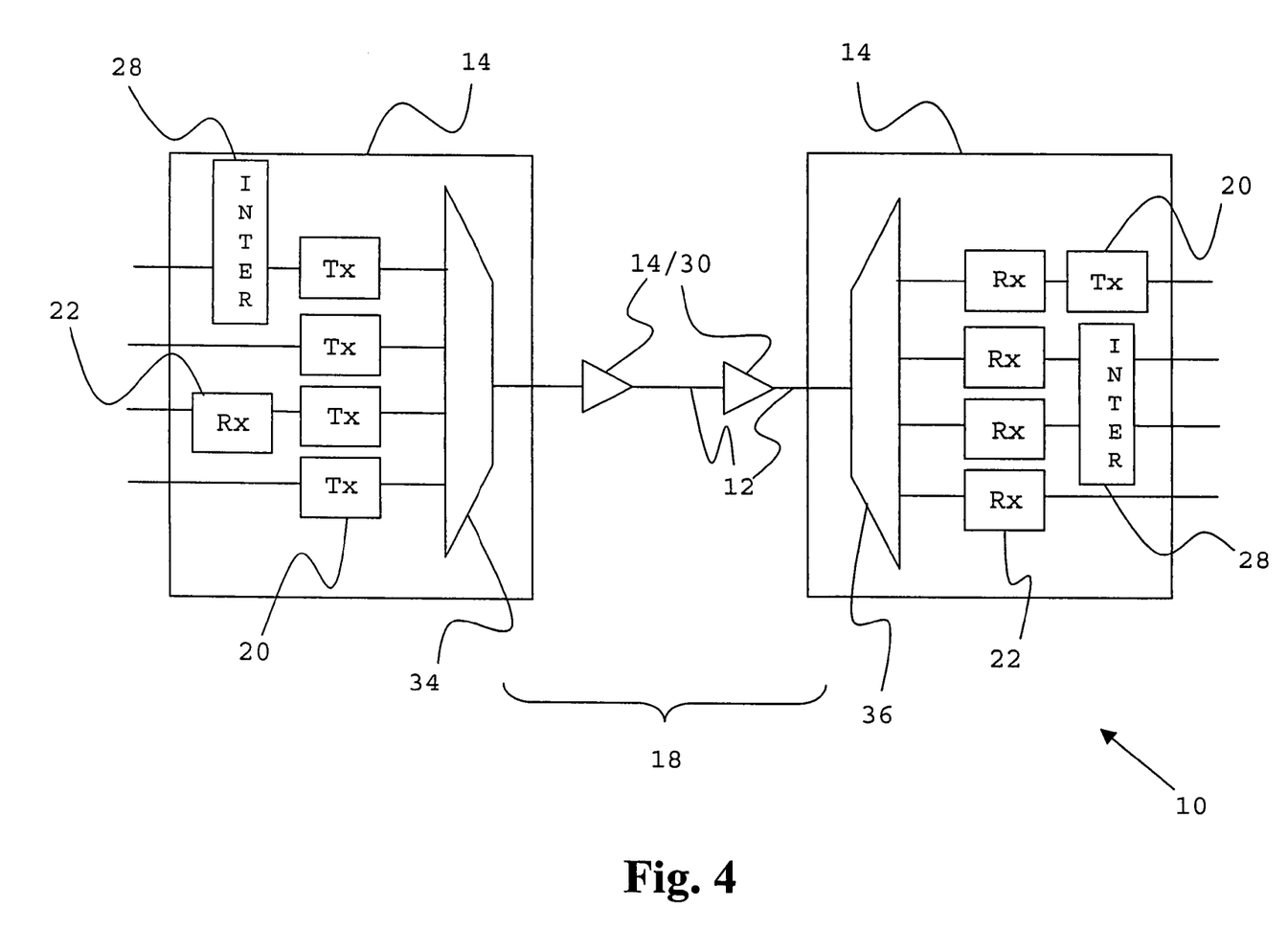

FIG. 4 illustrates another embodiment of the system 10 including a link 18 of four nodes and network elements 14. That system 10 can, for example, be all or part of a point to point system 10, or it may be part of a multi-dimensional, mesh, or other system 10. One or more of the nodes or network elements 14 can be connected directly to the network management system 16 (not shown). If the system 10 is part of a larger system, then as few as none of the nodes or network elements 14 can be connected to the network management system 16 and all of the nodes and network elements 14 can still be indirectly connected to the NMS 16 via another node or network element 14 in the larger system 10.

Figure 5:
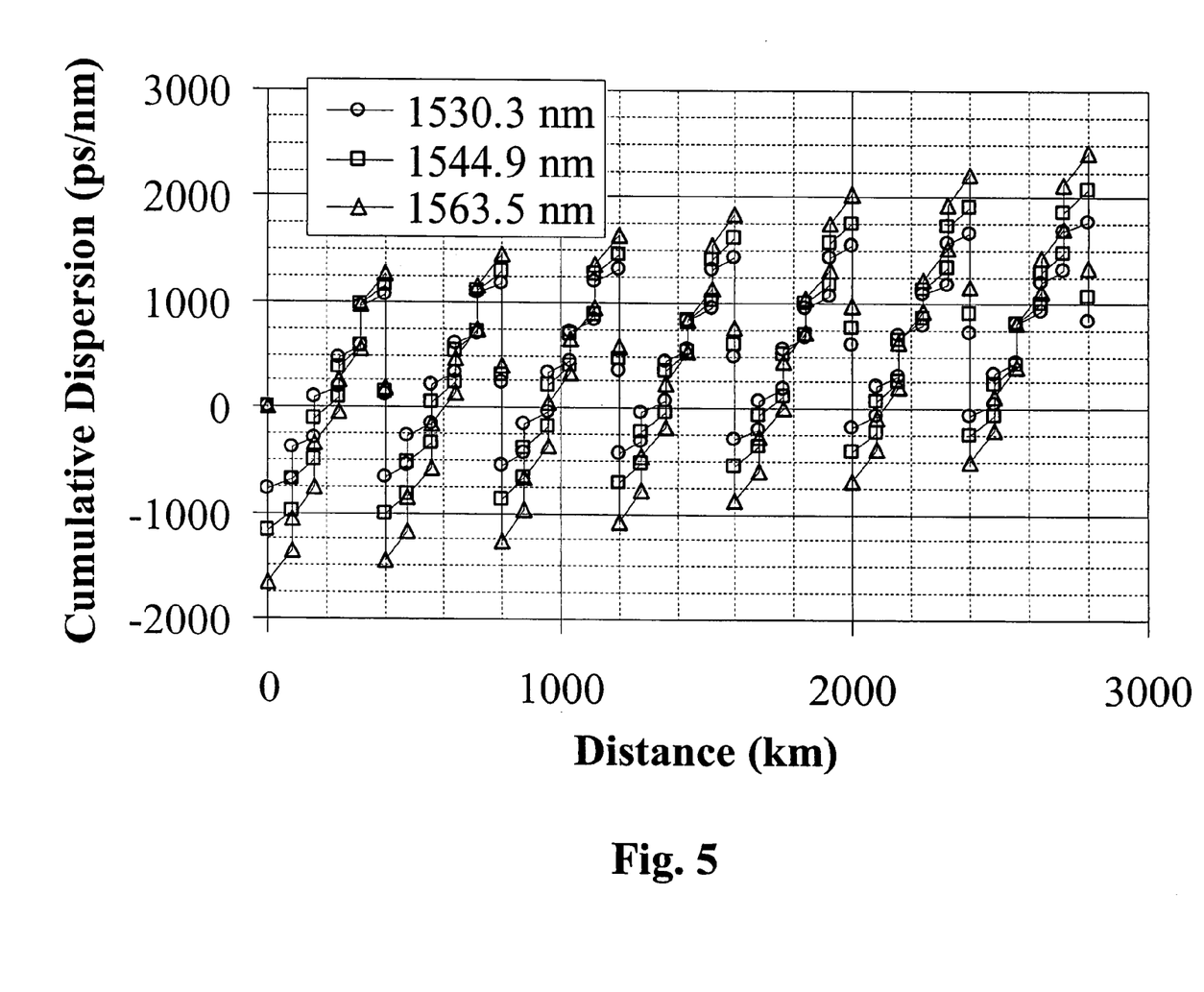
FIG. 5 is a dispersion map according to one embodiment of the present invention.

FIG. 5 is a dispersion map illustrating one embodiment of the present invention. In this embodiment, the dispersion map corresponds to a system 10 with seven links, each with five spans, and each span being eighty kilometers long. The fiber used in the system 10 is a low dispersion fiber, such as True Wave Classic. The number of links and spans, the distance between links, the fiber type, and other characteristics can vary from those described herein. For example, the system 10 may include more or less links than shown. Furthermore, the system 10 may have more or less spans per link, and the number of spans may be the same for each link, or they may vary. Similarly, the length of each span may be the same, or some spans may be longer than others. Those and other variations are within the scope of the present invention.

In the illustrated embodiment, negative dispersion compensation is introduced at each node, and positive dispersion compensation is introduced in each link. For example, negative dispersion compensation may be introduced in node amplifiers, and the positive dispersion compensation may be introduced in line amplifiers 30 between the links. Dispersion may be introduced, for example, at both the transmit and receive sides of a node, as was done in the illustrated embodiment. Alternatively, the dispersion compensation may also be introduced in other parts of the nodes and links, and may be introduced in all nodes and links or in less than all nodes and links, or introduced at one or more locations within or between the nodes and links, such as the transmit side, the receive side, or other locations, depending on the particular application. In other embodiments, for example, dispersion compensation may be introduced only in the links.

The dispersion compensation need not be applied to individual signal channels. Rather, it can be applied to a WDM signal as a whole. In the examples described herein, the dispersion compensation is applied to the entire WDM signal, not to individual channels. In other embodiments, however, individual or group dispersion compensation may be utilized with other aspects of the present invention. Although such embodiments may provide increased performance, they will also likely be more expensive.

It has been found that the introduction of additional dispersion according to the present invention results in a reduction in non-linear interaction penalties. For example, some advantages are realized with the introduction of dispersion which must be compensated for at another location in the system 10. In the case of the embodiment illustrated in FIG. 5, the optical signals generally acquire positive dispersion as they move through that system 10. Nonetheless, additional positive dispersion is introduced in the spans, and that additional dispersion must be compensated with negative dispersion which is added at the nodes. Nonetheless, that additional positive dispersion, when utilized as described herein, provides improved performance.

The advantages of the present invention are not limited to the illustrated embodiment. Using FIG. 5 as an example, negative dispersion compensation may be introduced at locations other than the nodes, such as in spans adjacent to the nodes, or in spans in the middle of the links. Furthermore, positive dispersion compensation may be introduced in other locations as well, including the nodes or between the spans, such as in the line amplifiers 30. Likewise, one or more of the nodes and the spans may include both positive and negative dispersion compensation, or some of the nodes and spans can include positive dispersion compensation and other of the nodes and spans can include negative dispersion compensation. Such embodiments may be particularly advantageous in long links. On the other hand, dispersion compensation does not need to be introduced at every node and in every link or span. The particular embodiment can vary depending on the particular system 10 and the desired performance.

In another embodiment of the present invention, the dispersion introduced in the nodes on either side of a link may be different. In other words, one node may introduce positive dispersion and the other node may introduce negative dispersion or, alternatively, dispersion may be introduced at only one node, or the amount of dispersion in the nodes may differ. In the former case, for example, positive dispersion may be introduced at the first node, positive dispersion may be introduced along the links, and an appropriate amount of negative dispersion may be introduced at the subsequent node. In another embodiment, positive dispersion may be introduced at the first node, and negative dispersion introduced along the links and at the other node. In another embodiment, dispersion may be introduced at only one of the nodes on either side of a link. In another embodiment, dispersion may not be introduced in the nodes, but rather a combination of positive and negative dispersion may be introduced only in the links. Furthermore, as discussed above, dispersion having the same or different signs may be located at one or more locations within nodes or spans or links, such as at the receiver sides, the transmitter sides, or the middle. It is sometimes desirable, such as in longer links, to have dispersion having the same sign in both the nodes and the spans and also having dispersion of the opposite sign in the span.

In general, it is advantageous to introduce as much negative dispersion as possible in the transmit node of each link. As already stated, adding positive dispersion along the link reduces nonlinear penalty. In addition, the added positive dispersion enables additional negative dispersion to be introduced in the transmit node while maintaining the overall residual dispersion of the circuit within acceptable values.

Figure 6:
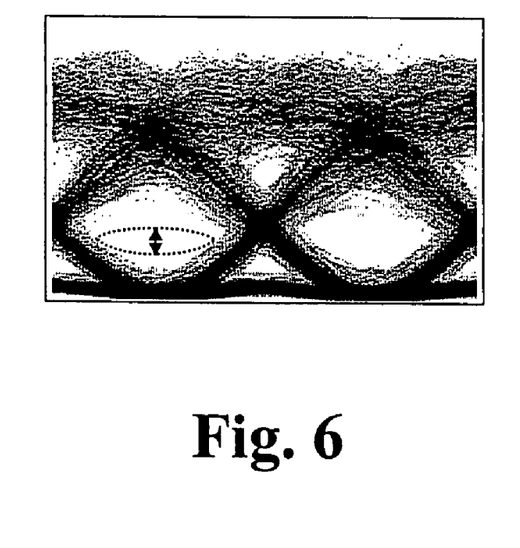
FIG. 6 is an eye diagram corresponding to the prior art dispersion map of FIG. 1.
Figure 7:
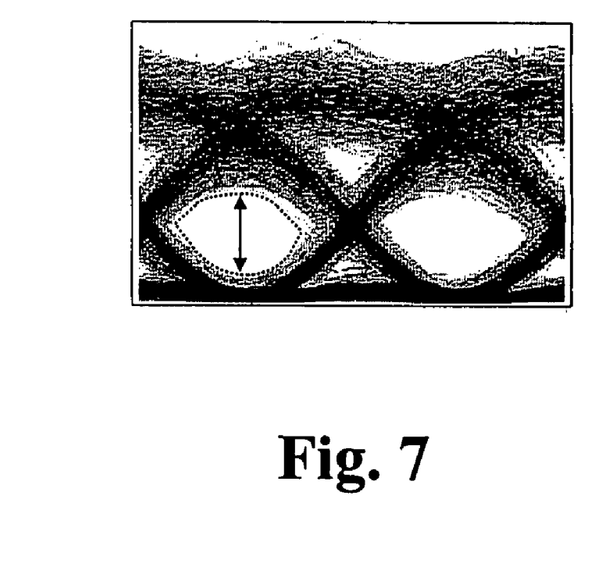
FIG. 7 is an eye diagram corresponding to the embodiment of the present invention illustrated in FIG. 5.
Figure 8:
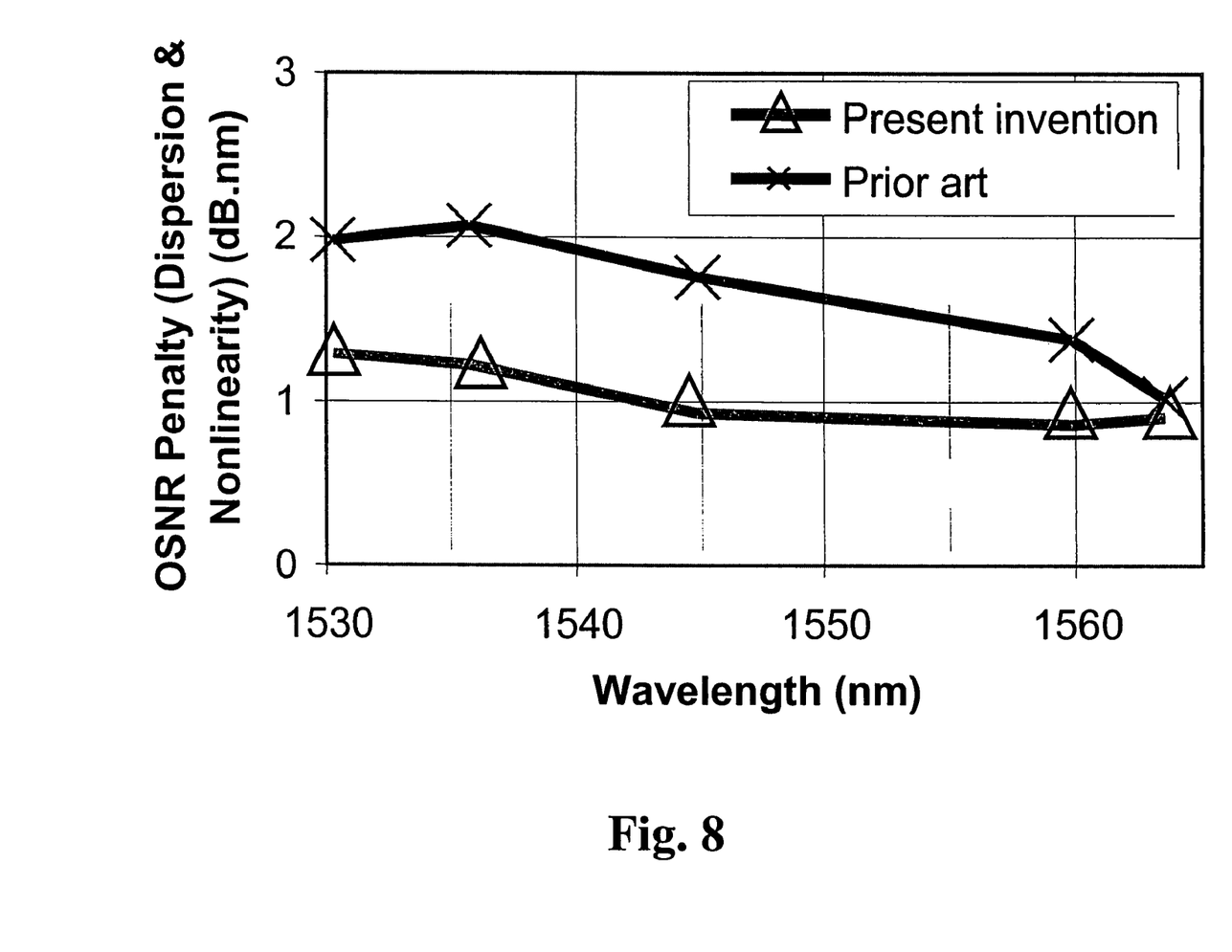
FIG. 8 is a chart illustrating OSNR penalty as a function of wavelength for both the prior art dispersion map illustrated in FIG. 1 and the embodiment of the present invention illustrated in FIG. 5.

FIGS. 6 and 7 are simulated eye diagrams for 1530.3 nm signals which have propagated 2800 km in the systems 10 illustrated in FIG. 1 (prior art) and FIG. 5. The eye produced by the dispersion map according to the present invention is significantly more open than the eye produced by the prior art. FIG. 8 is a chart illustrating simulated OSNR penalty as a function of wavelength for the prior art system (FIG. 1) and the exemplary embodiment of the present invention (FIG. 5). The present invention substantially reduces the magnitude of the penalty. Applicant has found that the introduction of positive dispersion compensation in the links contributes to the improved performance of the present invention as illustrated in FIGS. 6-8.

The optimal amount of dispersion, both positive and negative, depends on several factors, such as "residual dispersion" and "bit walkoff". "Residual dispersion" in FIG. 5 is the amount of uncompensated (or overcompensated, in which case residual dispersion is negative) dispersion that remains at the end of the circuit. Residual dispersion as a function of distance is the difference between the positive dispersion of a link and the negative dispersion in the nodes and link. This difference may be constant or it may vary, and it may be positive, negative, or zero. In FIG. 5 the residual dispersion is positive for all wavelengths and accumulates at a constant rate with distance. In other embodiments, the residual dispersion may be negative and/or it may accumulate at varying rates. For example, the difference between the positive dispersion in the link and the negative dispersion in a corresponding node may not always the same. The optimal amount of residual dispersion can vary, such as with different fiber types, different signal formats, etc.

"Bit walkoff is related to the dispersion in the link and is a measure of bit walkoff between adjacent signal channels. By increasing the dispersion in a link, adjacent bits will "walk away" from each other as they traverse the link, thus minimizing the non-linear interaction between those bits.

Figure 9:
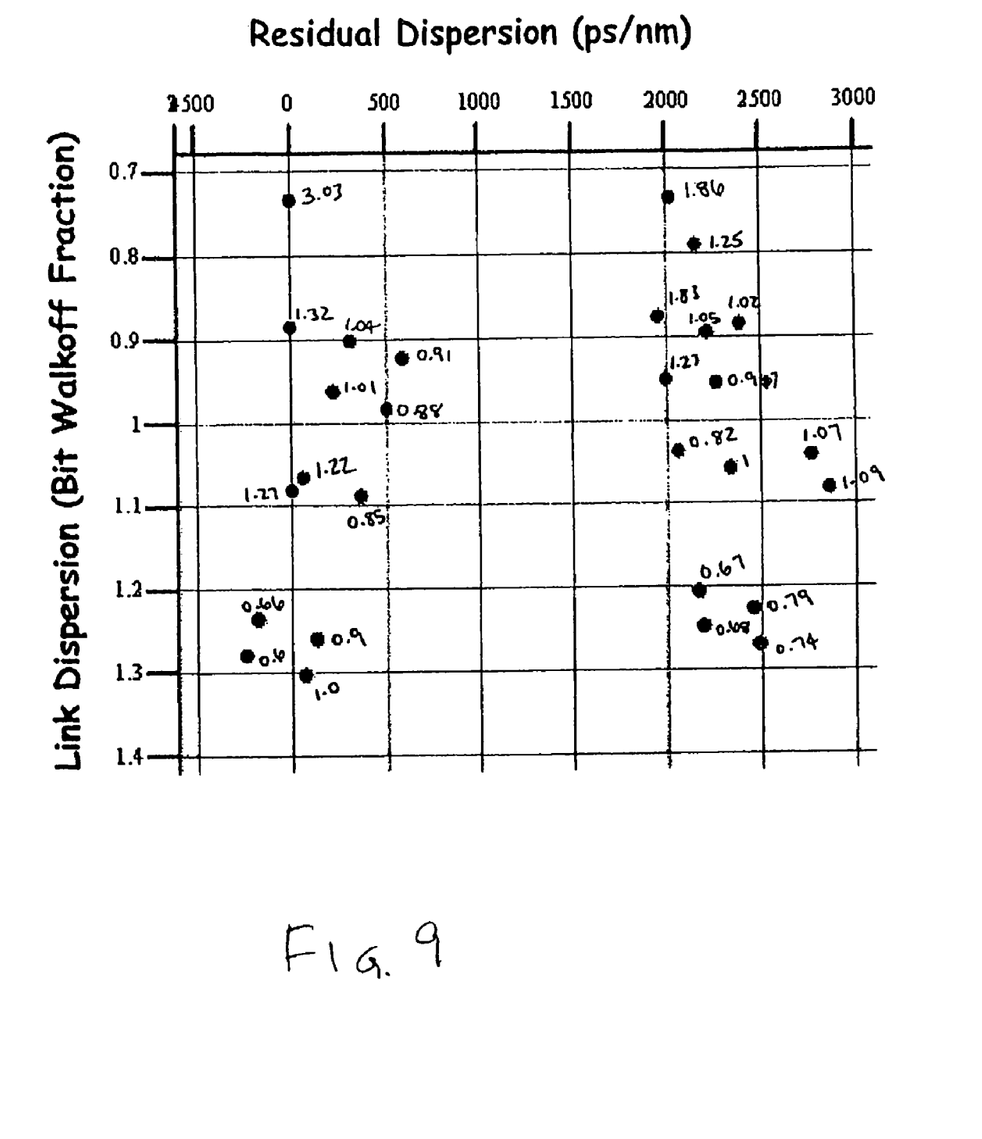
FIG. 9 is a graph illustrating expected dispersion penalties for various combinations of residual dispersion and bit walkoff.

FIG. 9 is a graph illustrating simulated dispersion penalties for various combinations of residual dispersion and bit walkoff. The data in the graph is derived from simulations for systems 10 with seven links, each link with five spans, each span being eighty kilometers long, and using True Wave RS In these examples, relatively high penalties are observed in systems 10 with both low residual dispersion and a low bit walkoff. In contrast, a bit walkoff of about one suggests generally good results across a wide range of residual dispersion values. However, the results for a particular system 10 can vary significantly from the results shown here. Factors such as fiber type, signal format, and other factors can affect the results.

Performance can be further improved, particularly across a wide signal band, such as the C-band, with the introduction of fiber with a high positive dispersion such as standard SMF fiber to provide positive dispersion into the system 10. For example, SMF fiber may be located in line amplifiers 30 in the links, or at other locations in the system 10. The SMF fiber may be lumped or distributed, which can affect the performance of the system 10. Although SMF fiber is relatively inexpensive and easy to obtain, other positive, high dispersion fibers could also be used. For example, AllWave has the same dispersion and other characteristics of SMF, but has a lower loss profile in the 1400 nm range.

Another aspect of the invention provided herein is to allow all C-band wavelengths to travel on the same dispersion map. It is expected to be less expensive than the prior art alternatives and to allow the network designer greater flexibility. Although the invention will be described in terms of the C-band and True Wave Classic fiber, the invention may also be applied to other transmission bands, or portions or combinations thereof, and may be applied to other fiber types.

According to the invention, a True Wave Classic link is significantly undercompensated. For example, a 960 km link may be compensated so that at 1539 nm the residual dispersion is ~−400 ps/nm and at 1565 nm the residual dispersion should be ~1541 ps/nm. It has been found that superior results can be achieved if the dispersion compensating fiber is placed every three or four True Wave Classic spans.

It has also been found that superior results can be achieved if wavelengths at the lower portion of the C-band (~1530 nm to ~1548 nm) are propagated with little or no chirp and wavelengths at the upper portion of the C-band (~1548 nm to ~1565 nm) are propagated with substantial chirp. The concept was modeled with an alpha parameter of ~0.8, however other chirp values may also provide good results. By chirping one or more portions of the band and not chirping or differently chirping other portions of the band, several different dispersion tolerance parabolas can be created, each tailored to its respective portion of the band.

Figure 10:
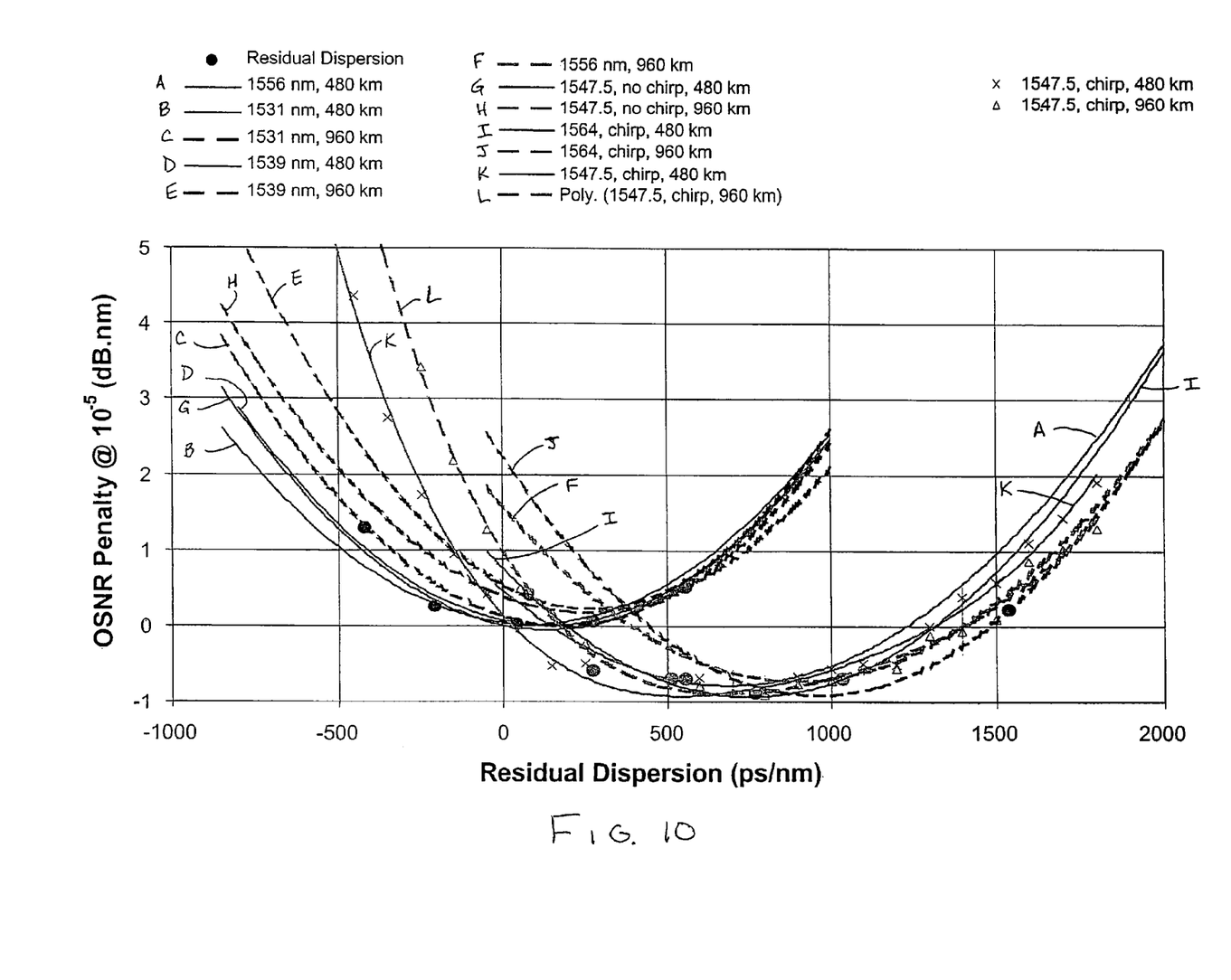
FIG. 10 is a diagram of OSNR Penalty verses residual dispersion as may be seen according to the present invention.

FIG. 10 is a diagram of OSNR penalty verses residual dispersion as may be seen according to the aspect of the present invention which mitigates poor True Wave Classic slope compensation. The illustrated embodiment also significantly undercompensates the links for all wavelengths. This improves the penalty range of the lower portion of the C-band, and provides for cost and power budget saving by using less dispersion compensation fiber. Also, the upper portion of the C-band was chirped with an alpha parameter of ~−0.8. This shifts the dispersion tolerance to positive dispersion values (~700 ps/nm) and improves the penalty range of the upper portion of the C-band. Only one chirp value is used over the entire upper portion of the C-band, although several chirp values may be used on several portions of the band.

In the illustrated embodiment, the centers of the dispersion tolerance parabolas are shifted by about 700 ps/nm, resulting in two dispersion tolerance parabolas, one for the upper portion of the C-band and one for the lower portion of the C-band. This provides for greater tolerance throughout the band. Wavelengths in the center of the C-band can be propagated with or without chirp. It has been found that the interaction of chirp, non-linearity, and dispersion leads to better performance than an unchirped, perfectly compensated link. Accordingly, depending on the specific implementation, it may be advantageous to chirp more than half of the band.

Although the present invention is generally described in terms of low dispersion fiber and the C-band, the present invention is also applicable to other fiber types and other signal bands. In particular, the present invention offers improved performance by reducing non-linear interactions, which can occur in many types of fiber and signal bands. Other variations and modifications of the present invention are possible and contemplated, and it is intended that the foregoing specification and the following claims cover such modifications and variations.

The invention claimed is:

1. An optical communications system, comprising:
   a first node;
   a second node;
   a plurality of spans between the first and second nodes, wherein each of the spans include transmission media;
   at least one amplifier between the plurality of spans;
   a first dispersion compensation fiber located in the first node;
   a second dispersion compensation fiber located in the second node, wherein the second dispersion compensation fiber has a same sign as the first dispersion compensation fiber; and
   a third dispersion compensation fiber located in the at least one amplifier between the plurality of spans, and wherein the third dispersion compensation fiber induces dispersion that is opposite in sign to that induced by the first dispersion compensation fiber.

2. The system of claim 1, wherein the first and second dispersion compensation fibers are negative dispersion compensation fiber, and wherein the third dispersion compensation fiber is positive dispersion compensation fiber.

3. The system of claim 1, wherein the third dispersion compensation fiber is negative dispersion fiber, and the first and second dispersion compensation fibers are positive dispersion fibers.

4. The system of claim 3, further comprising additional dispersion compensation fiber located in at least one of the spans, wherein the additional dispersion compensation fiber is negative positive dispersion compensation fiber.

5. The system of claim 1, further comprising additional dispersion compensation fiber located in at least one of the spans, wherein the additional fiber has a same sign as the first fiber.

6. An optical communication system, comprising:
a plurality of nodes;
a plurality of links, each link connecting a plurality of nodes;
a plurality of spans forming each link;
a plurality of amplifiers between the spans;
negative dispersion compensation fiber located in at least one of the nodes;
positive dispersion compensation fiber located in at least one of the amplifiers and nodes.

7. The system of claim 6, wherein positive dispersion in a link is greater than a magnitude of a sum of negative dispersion compensation in a pair of nodes corresponding to the link.

8. The system of claim 7, wherein positive dispersion in each of a plurality of links is greater than a magnitude of a sum of negative dispersion in each of a plurality of corresponding pairs of links.

9. The system of claim 8, wherein the plurality of nodes and corresponding plurality of links form a contiguous optical signal path.

10. The system of claim 6, further comprising negative dispersion compensation fiber located in at least one of the links containing positive dispersion fiber.

11. A method of propagating an optical signal, comprising:
introducing dispersion compensation into the optical signal in a first node;
directing the optical signal into a link including at least one amplifier;
dispersion compensating the optical signal a plurality of times in the amplifier in the link, such that dispersion compensation in the link is opposite the additional dispersion introduced in the first node;
directing the optical signal into a second node;
dispersion compensating the optical signal in the second node, such that the dispersion compensation in the second node is opposite in sign to dispersion compensation in the amplifier.

12. The method of claim 11, further comprising introducing additional dispersion compensation into the optical signal in the amplifier such that additional dispersion compensation has a sign which is the same as the dispersion compensation in the first node.

13. The method of claim 12, wherein the dispersion compensation in the first and second nodes is negative dispersion compensation, and the dispersion compensation in the amplifier is positive dispersion compensation, and the additional dispersion compensation in the amplifier is negative dispersion compensation.

14. The method of claim 13, wherein the magnitude of the sum of the negative dispersion is less than the magnitude of the sum of the positive dispersion.

15. The method of claim 11, wherein the dispersion compensation in the first and second nodes is negative dispersion compensation, and the dispersion compensation in the link is positive dispersion compensation.

16. The method of claim 11, wherein the magnitude of the sum of the dispersion in the first and second nodes is less than the magnitude of the sum of the dispersion in the link.

17. The method of claim 16, wherein opposing dispersion in nodes and links is performed over a plurality of links and corresponding nodes.

18. The method of claim 17, wherein the plurality of links and corresponding nodes form a contiguous optical signal path.

* * * * *

UNITED STATES PATENT AND TRADEMARK OFFICE
CERTIFICATE OF CORRECTION

PATENT NO. : 7,406,264 B2
APPLICATION NO. : 11/311096
DATED : July 29, 2008
INVENTOR(S) : Sandra F. Feldman et al.

It is certified that error appears in the above-identified patent and that said Letters Patent is hereby corrected as shown below:

On Page 2, left column under the heading "OTHER PUBLICATIONS", please delete the last four lines beginning with "Marhic, M.E., et al" to and ending with "pp. 145-147", and insert the following:
-- Marhic, M.E., et al, Optimizing the Location of Dispersion Compensators in Periodically Amplified Fiber Links in the Presence of Third-Order Nonlinear Effects, IEEE Photonics Technology Letters, vol. 8, No. 1, Jan. 1996, pp. 145-147. --

Signed and Sealed this

Nineteenth Day of May, 2009

JOHN DOLL
*Acting Director of the United States Patent and Trademark Office*